United States Patent [19]
Brokoff et al.

[11] 4,079,232
[45] Mar. 14, 1978

[54] CONTACT HEATER MECHANISMS FOR THERMOFORMING MACHINES

[75] Inventors: Terrance L. Brokoff, Gladwin; Jerome E. Froehlich, Midland; George L. Pickard, Jr., Beaverton, all of Mich.

[73] Assignee: Koehring Company, Milwaukee, Wis.

[21] Appl. No.: 616,408

[22] Filed: Sep. 24, 1975

[51] Int. Cl.² .......................... B21J 5/12; H05B 3/32
[52] U.S. Cl. ...................................... 219/154; 72/342; 100/93 P; 156/499; 156/583; 219/243; 219/530; 264/92
[58] Field of Search .................. 72/342; 100/93 P; 156/499; 264/92; 219/152, 154, 156, 243, 530; 432/121, 138; 425/388, 392

[56] References Cited
U.S. PATENT DOCUMENTS

| 3,045,098 | 7/1962 | Norton | 219/530 X |
| 3,269,885 | 8/1966 | Cianci | 156/583 |
| 3,478,192 | 11/1969 | Fink | 219/243 |
| 3,583,036 | 6/1971 | Brown | 425/388 X |
| 3,859,159 | 1/1975 | Carter et al. | 156/583 X |
| 3,868,209 | 2/1975 | Howell | 425/388 X |
| 3,888,719 | 6/1975 | Gibbs et al. | 219/243 X |

Primary Examiner—J. V. Truhe
Assistant Examiner—N. D. Herkamp
Attorney, Agent, or Firm—Learman & McCulloch

[57] ABSTRACT

Contact heater station mechanism for use in a thermoforming machine for particularly forming thermoplastic synthetic plastic and superplastic metal alloy sheets into shapes, such machines having a sheet transfer station, a heating station, and a forming station with relatively movable mold parts, and providing a circuit for sheet carrying carriages which index individually clamped sheets from one station to another cyclically in a path of travel. The mechanism includes platens mounted on the machine frame at the heating station to move toward and away from the path of travel of the carriages and sheets. A heater carrrier for elongate electrical resistance heaters carries a contactor plate, and is rigidly mounted to each platen in a manner to permit universal thermal expansion of the carrier and plate with respect to the platen. A motor is provided for moving each platen toward and away from a carriage indexed to the heating station to move the contactor plates into and out of heat transfer relationship with the sheet releasably clamped to the carriage.

7 Claims, 13 Drawing Figures

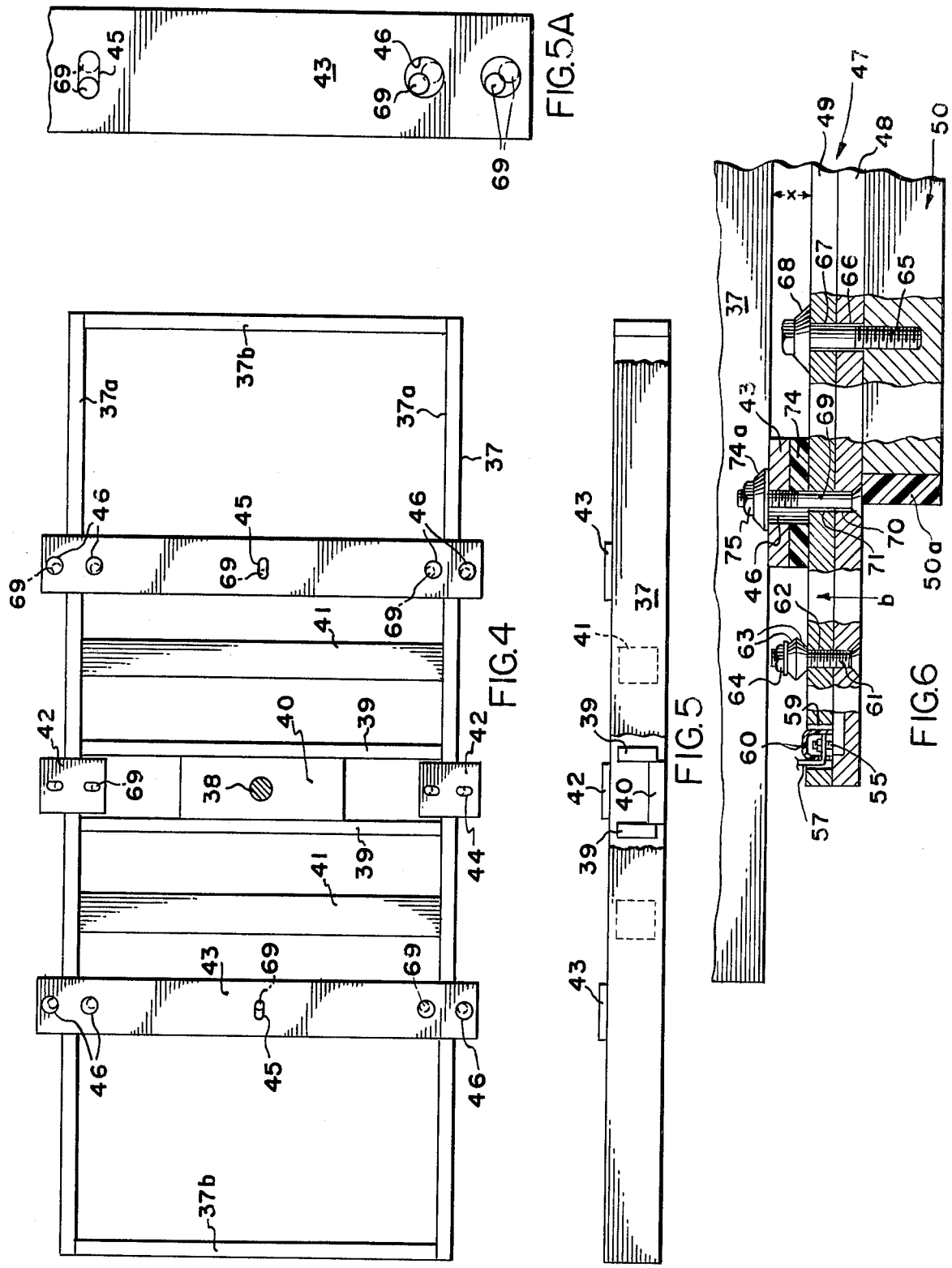

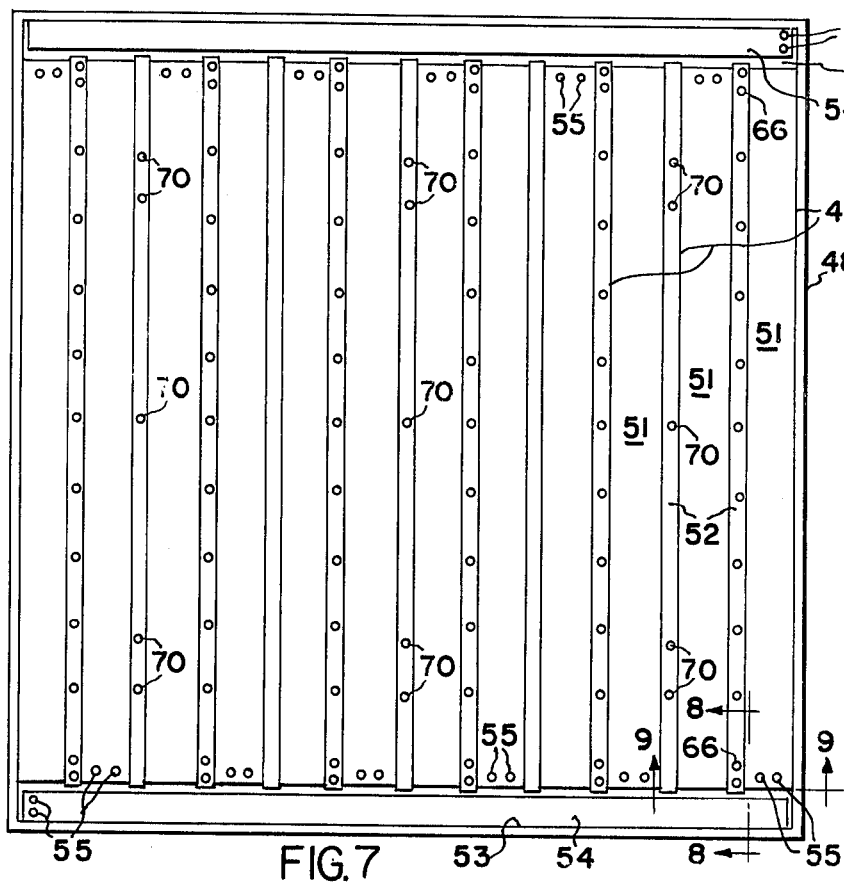
FIG.7
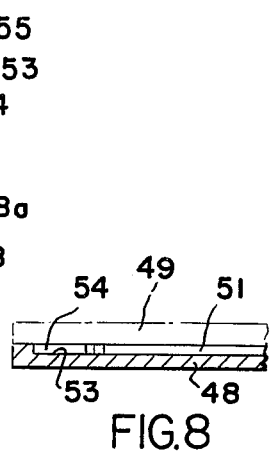
FIG.8
FIG.9
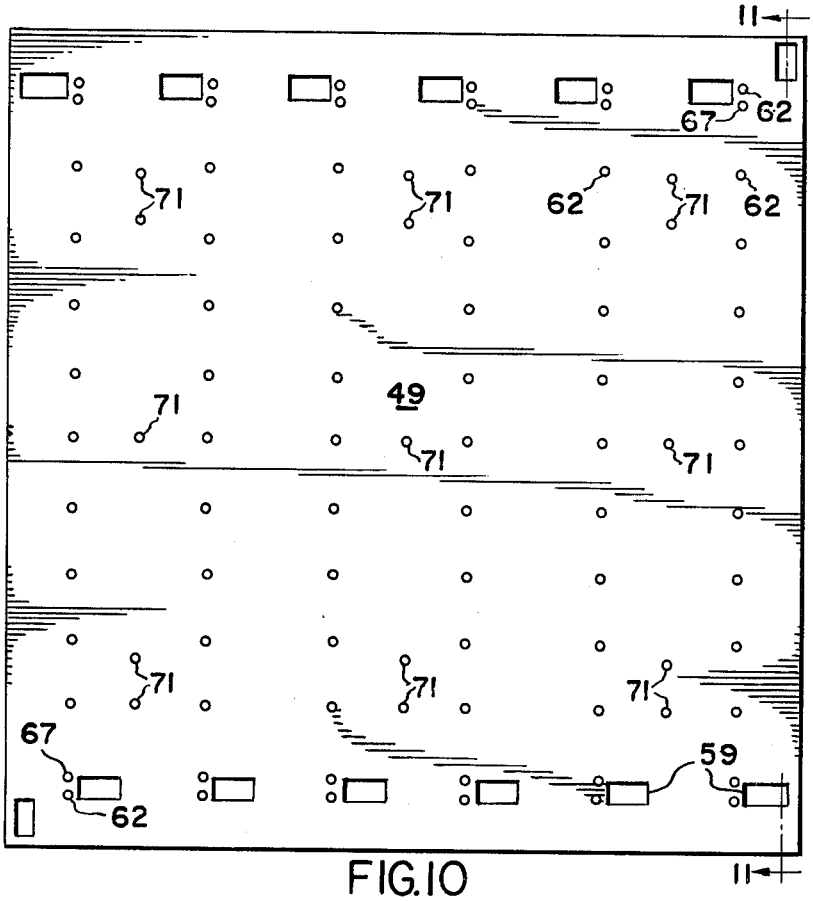
FIG.10
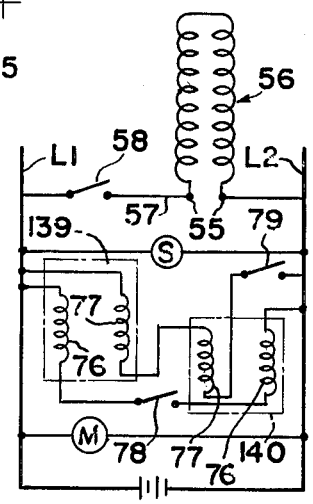
FIG.12
FIG.11

CONTACT HEATER MECHANISMS FOR THERMOFORMING MACHINES

BACKGROUND OF THE INVENTION

Differential pressure forming machinery for thermoplastic synthetic plastic sheets, and wherein the sheets are individually clamped in carriages and move in a continuous path from a loading station (where the sheets are individually loaded to a sheet clamping carriage), to a heating station (where the sheets are heated to a forming temperature at which they may be formed) to a forming or molding station (wherein the sheets are deformed by way of direct compression or differential pressure forces, or a combination of these, to the configuration of molds) and thence are indexed to an unloading station, and such machinery is disclosed for example in the present assignee's Brown Pat. No. 3,583,036. As this prior U.S. patent indicates, the heating station may be made up of two sets of upper and lower heating mechanisms arranged respectively above and below the path of travel of the sheets and a typical loading-unloading station may comprise a location at which the sheet which has been formed is unloaded and a circumferentially adjacent location at which a new sheet is reloaded. Differential pressure plastics forming machinery of this character conventionally employs radiant heaters which are located a predetermined distance away from the path of travel of the sheet at a heating station which may comprise one or more heating locations and sets of heaters, and normally the sheets sagged after being heated, as the heated portions became deformable and lost mechanical strength.

Recently, it has been determined that certain superplastic metal alloys can be formed much like plastics under very small forces and at temperatures in the neighborhood of 500° F. This property of superplasticity, which allows particular alloys such as zinc alloys (which may comprise 78% zinc and 22% aluminum) to be formed, is described in U.S. Pats. Nos. 3,340,101, 3,567,524, and 3,420,717. Forming processes for such superplastic alloys similarly include vacuum forming and compression forming.

One of the prime objects of the present invention is to provide contact heater mechanism which is particularly useful for heating certain thermoplastic synthetic plastics and superplastic metal alloys to a forming termperature. For example, it has been found that the apparatus which will be described transfers heat to the high moisture content plastic sheets or webs in a manner which does not cause the moisture to bubble out of the plastic or permit the plastic sheet to sag. Formerly, problems have been encountered with plastics such as certain polycarbonates and polystyrenes which attract moisture and build up a relatively high moisture content, and of course, sagging has traditionally been a well-recognized and accepted condition which is difficult to control. In present practice, separate ovens must operate at temperatures in the neighborhood of 1100° F. in order to accomplish pre-drying of such material before it is then cooled and loaded to conventional forming machinery wherein reheating occurs and forming is carried out at sheet-forming temperatures in the range of 280° – 320° F. This not only is costly in terms of power consumption, it also greatly increases fire hazards in the area of operation.

At the same time, it has been found that such contact heater mechanisms are extremely well suited to the heating of superplastic metallic alloys to forming temperatures in the neighborhood of 500° F., without creating sag or other problems.

It is a principal object of the present invention to provide highly reliable and efficient apparatus which is capable of use to heat both plastics and superplastic metals to forming temperatures in a manner which avoids many of the problems presently encountered with other heating methods.

Another important object of the invention is to provide mechanism which is constructed to permit thermal expansion of some of the parts relative to the others.

Still another object of the invention is to provide a construction employing a sandwiched heating mechanism wherein electrical resistance heating elements are enclosed within the confines of sandwiched heater plates mounting contactor plates which are moved toward and away from heat transfer relationship with the sheet to be heated to forming temperature.

Still another object of the invention is to provide a construction of the character mentioned wherein changeover costs are reduced and the contactor plates can be readily removed and changed to permit contactor plates of different size or shape to be mounted in position to heat sheets of varying size and shape.

Another object of the invention is to provide contact heater mechanism utilizing a multiplicity of electrical resistance heater elements which can be individually activated or deactivated to provide a zoned heat control which can selectively impart heat to particular areas of the contactor plates.

Another object of the invention is to provide contact heater apparatus of the character mentioned wherein strip heaters are employed, and in which they are arranged so that the creation of large cold spots is avoided.

Other objects and advantages of the invention will be pointed out specifically or will become apparent from the following description when it is considered in conjunction with the appended claims.

SUMMARY OF THE INVENTION

More particularly the invention is directed to a machine having upper and lower platens which are both moved toward and away from the path of travel of sheet-carrying carriages and the opposite sides of a sheet carried thereby. The platens each mount an electrical resistance heater carrier which includes a contactor plate, and each carrier is rigidly mounted on the platen in a manner to permit thermal expansion of the carrier with respect to the platen. The carrier is insulated from the platen in a manner to avoid as much heat transfer to the platen and other parts of the machine as possible.

IN THE DRAWINGS

Figure 2:
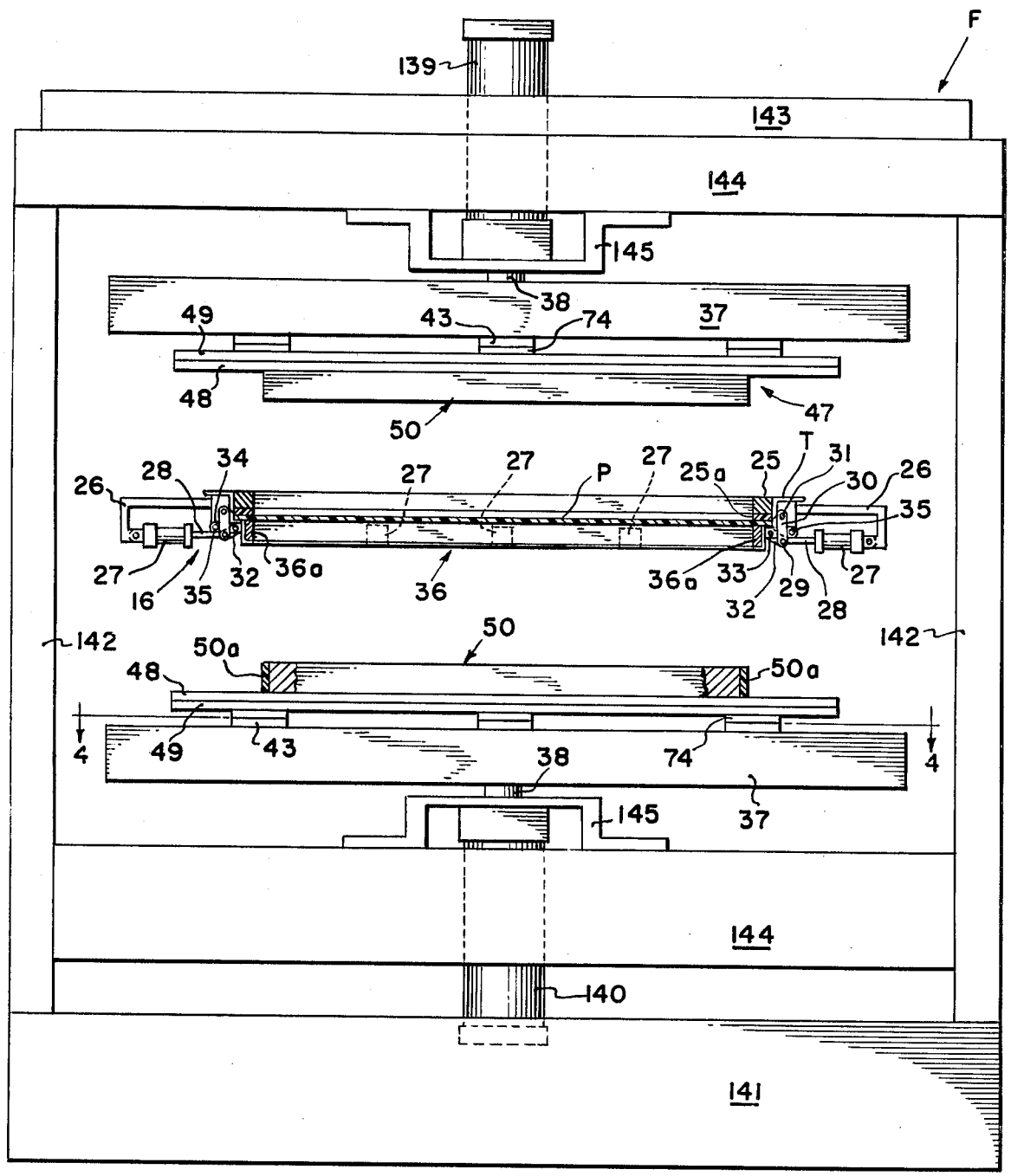
FIG. 2 is an elevational view taken along the lines 2—2 of FIG. 1, and showing the contact heating mechanism on an enlarged scale.

FIG. 4 is an enlarged plan view of one of the platens employed at the heating station, taken on the line 4—4 of FIG. 2, and with chain lines illustrating the position of the clamping bolts which are carried by one of the heater parts when the heater parts are in a normal or non-thermally expanded state;

FIG. 5 is an edge elevational view thereof;

FIG. 5a is a fragmentary, enlarged plan view of one of the platen mount plates, with chain lines illustrating the position of the clamping bolts which are carried by one of the heater parts when the heater parts are in a thermally expanded state;

FIG. 6 is an enlarged, fragmentary, edge elevational view, with portions broken away to illustrate the manner of securing the contact heater parts together and to the platen which carries them;

FIG. 7 is a plan view of the heater carrier showing the heater strips position therein;

FIG. 8 is a fragmentary sectional view taken on the line 8—8 of FIG. 7;

FIG. 9 is a fragmentary cross-sectional view taken on the line 9—9 of FIG. 7;

FIG. 10 is a plan view illustrating the cover plate which mounts to the heater carrying plate illustrated in FIG. 7;

FIG. 11 is a fragmentary sectional view taken on the line 11—11 of FIG. 10; and

FIG. 12 is a schematic electrical diagram illustrating the manner in which the contact heater mechanism may be controlled.

GENERAL DESCRIPTION

Figure 1:
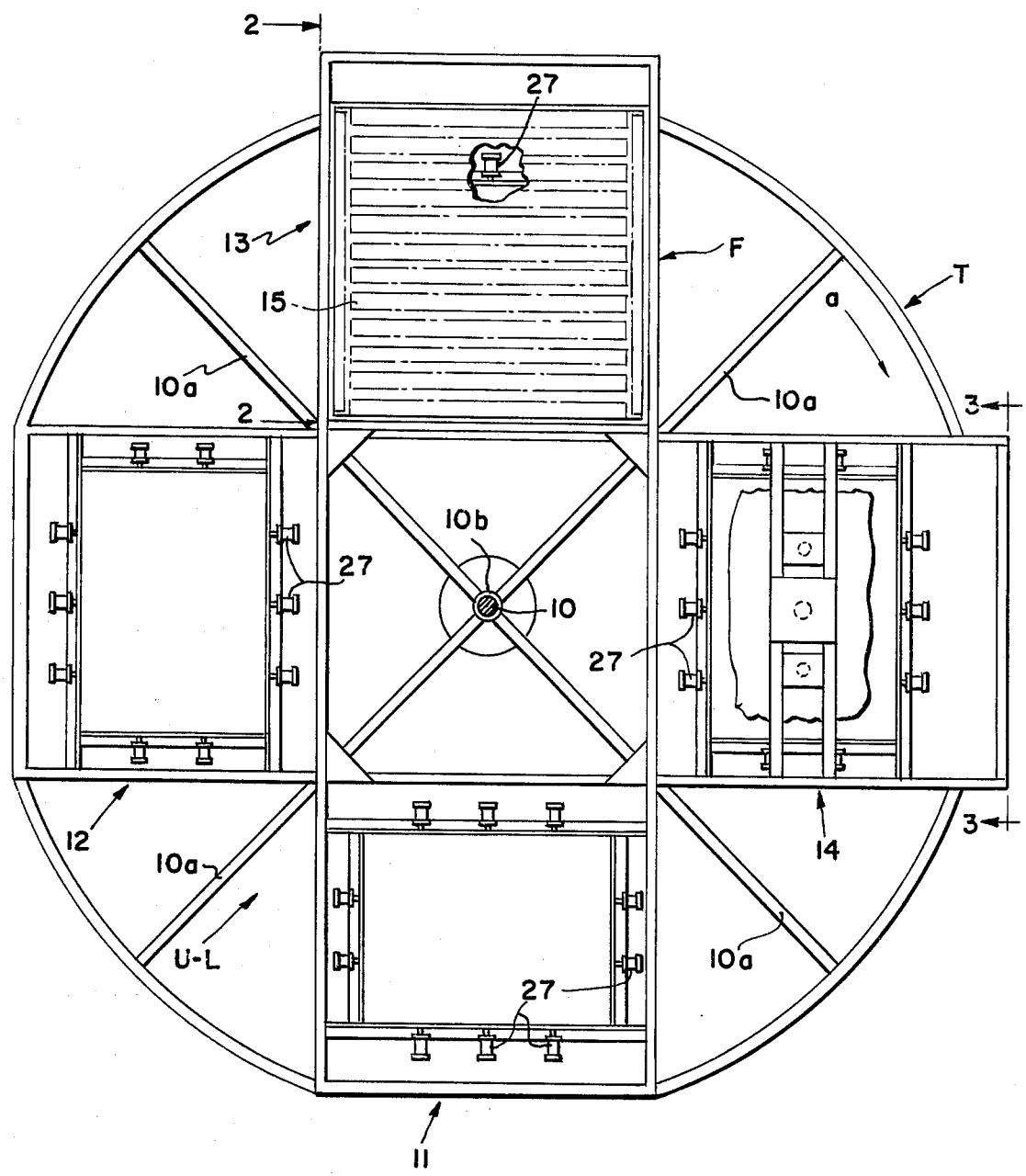
FIG. 1 is an over-all top plan view schematically illustrating a forming machine incorporating the invention.

Referring now more particularly to the accompanying drawings and in the first instance to FIG. 1, we have shown a turntable T fixed on a shaft 10 supported by a frame or framework F. The turntable T may include spokes 10a, which are fixed to a hub 10b which is keyed to the shaft 10, and the turntable T, as shown, is mounted for indexing rotary movements in the clockwise direction a. The frame F provides frame members which define various stations, at which the turntable T stops and dwells, to permit operations to be performed upon the sheets P which are carried by the turntable T. For example, a loading-unloading station or location, generally designated U-L, may comprise an unload station 11 and a load station 12, followed clockwisely by a heating station generally designated 13 and a forming station generally designated 14. At the heating station 13, a resistance type ribbon heating element assembly is generally schematically shown at 15. It is to be understood that such are provided above and below the rotary path of four clamp frame assemblies, generally designated 16, which are revolved with the turntable T to indexed dwell positions at the various stations 11 through 14.

At the forming station 14, the frame F supports upper and lower mold members 17 an 18, respectively (see FIG. 3) on platens 19 and 20, respectively, which may be operated by the piston rods 21 of conventional double acting, fluid pressure actuated upper and lower cylinders 22 and 23 mounted on the frame F. Stabilizer cylinders 24, which operate to continuously urge the platens 19 and 20 in a direction away from the path of travel of carriages 16 are also provided and, of course, the pressure maintained in these is far less than the pressure utilized in cylinders 22 and 23 to move the platens 19 and 20 in a direction toward the path of travel of the carriages 16, and the sheets P which are carried thereby. The female mold 18 is provided with suction ports 18a in the usual manner, connected to a suitable source of suction, such as a conventional suction pump, and the male member 17 operates as a conventional plug assist to move the heated sheets P into the mold 18 when the cylinders 22 and 23 are operated.

Figure 3:
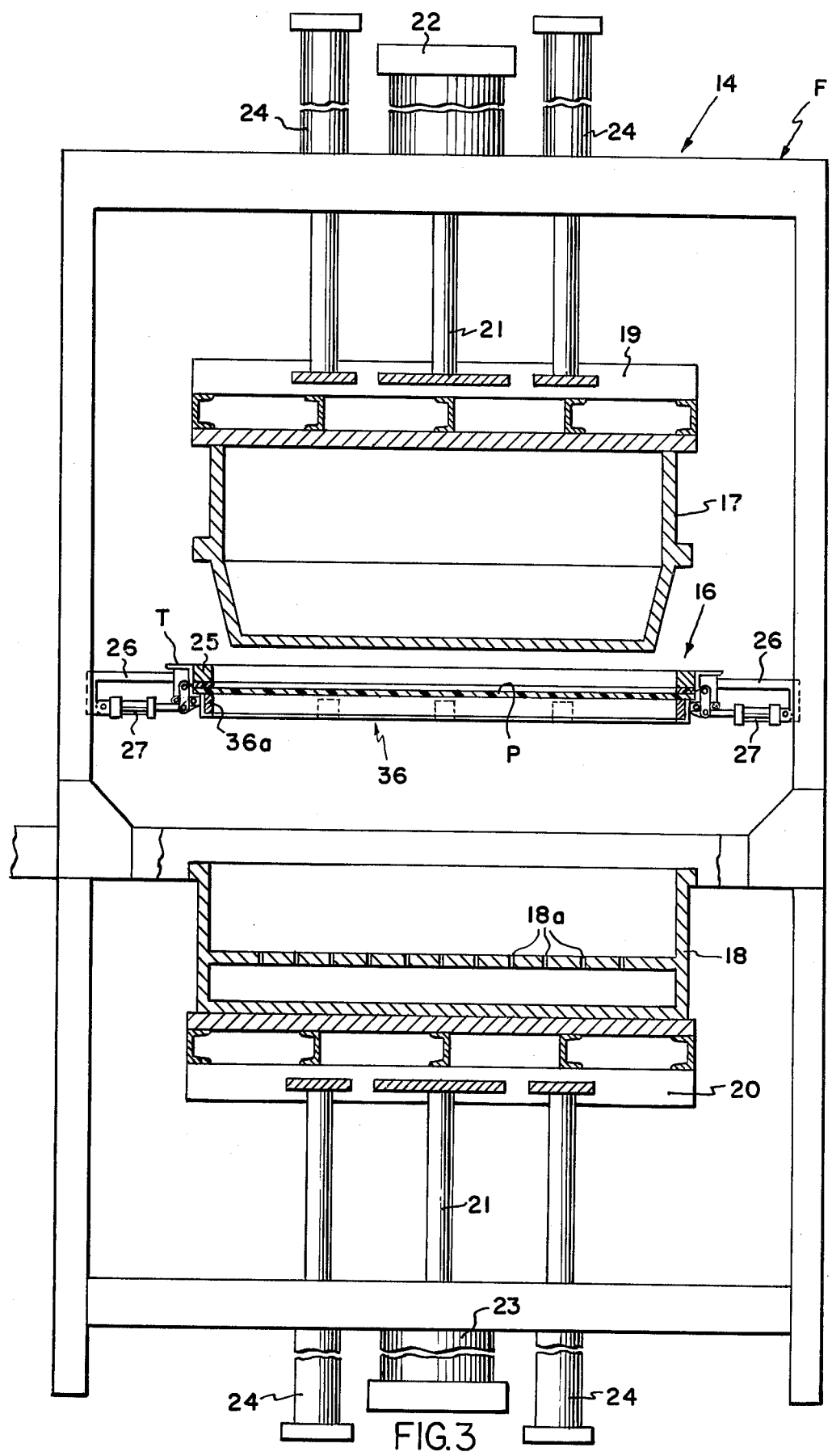
FIG. 3 is an elevational view taken along the lines 3—3 of FIG. 1 and showing, for purposes of illustration only, a forming station incorporating differential pressure forming molds.

As shown particularly in FIGS. 2 and 3, each sheet clamping frame assembly 16 comprises an upper, rectangular frame member 25 which is fixed to the turntable structure T. Heat insulating pad members 25a, for contacting the sheets P, are provided on the undersides of the framework members 25. Mounted on each side of each frame 25, are support brackets 26 for double acting, fluid pressure operated cylinders 27 having piston rods 28 which are pivotally connected at 29 to operatng levers or links 30, which are pivotally connected at 31 to the turntable structure T. Each pin 29 also pivotally connects a link 32 to each piston rod 28, the opposite end of each link 32 being pivotally connected as at 33 to a link 34 which is pivotally connected at 35 to the turntable structure T. The link 34 connects to the separable lower frame 36, which may be of similar rectangular form and is formed of four separate side rails 36a which may carry web penetrating pins (not shown) in the usual manner. When the piston rods 28 are withdrawn or retracted, the frame parts 36a are swung outwardly about pins 31, and at the same time are swung downwardly about pivot pins 35, until they reach withdrawn positions. It is to be understood that several cylinders 27 are provided on each separate side rail 36a of the frame 36 and that the separate side walls of the frame 36 are moved downwardly simultaneously when it is desired to remove the formed sheet P from the clamp frame assembly 16 at the unloading station 11.

THE CONTACT HEATING STATION

As has been indicated, the present invention is particularly concerned with the provision of a contact heater assembly both above and below the path of travel of carriages 16 and the individual plastic sheets P which are clamped therebetween (see FIG. 2). At heating station 13, the heater mechanism includes upper and lower resistance heater componentry which are of identical construction. Both such upper and lower assemblies includes a platen 37, connected with a piston rod 38 for movement toward and away from the path of travel of rotary carriages 16. The upper platen 37 is operated by a double acting, fluid pressure operated cylinder 139, mounted to framework F, while the lower platen 37 is operated by a double acting fluid pressure operated cylinder 140, which is similarly mounted to the framework F. Framework F, as shown, may comprise a base part 141, side supports 142, top rails 143, and cross rails 144. Guides 145 for the piston rods 38 may be provided on the cross rails 144 as shown.

As FIGS. 4 and 5 illustrate, each platen 37 comprises a rectangular framework with longitudinally disposed rails 37a and connecting end rails 37b. Intermediate the ends of the framework platens 37 are cross pieces 39 supporting a central block 40 to which piston rod 38 attaches. Cross rails 41 also are provided to brace the framework structure 37.

Provided on the inner side of each platen 37, are a pair of centrally disposed mount plates or pads 42 which centrally align with the axis of piston rod 38 and the central axis of block 40. Longitudinally or endwisely outboard of the block 40 and mount plates 42 are mount plates or bars 43, as shown particularly in FIG. 4. Openings 44, which are transversely or widthwisely elongate, are provided in mount plates 42 in alignment with the axis of piston rod 38 and the central axis of block 40. Similarly, the plates 43 carry elongate openings 45 which are longitudinally, or endwisely, elongate along an axis which is longitudinally aligned with the axis of piston rod 38 and the central axis of mount block 40. At the same time, at the ends of plate 43, enlarged openings 46 are also provided, for a purpose which will later also be explained.

In FIG. 6, the left-hand plate 43 in FIG. 4 is pictured, whereas in FIG. 5a, the right-hand plate or bar 43 in FIG. 4 is illustrated. It is to be understood that the operation of each of these plates 43 in terms of their function to mount the carrier heater assemblies is identical.

Mounted to the plates 42 and 43 on each platen 37, in a manner which will now be described, is a heater carrier, generally designated 47 (see particularly FIG. 6), which includes a resistance heater element carrier plate 48, a cover plate 49, and a contact plate or adapter plate 50, each of which is formed of a highly heat conductive material, (which also is relatively thermally expansible) such as aluminum. It is possible that other materials, such as brass, may be used in place of the aluminum plates described. Thermal insulating side strips 50a surround the sides of the plates 50 so that each functions as a heat sink.

As FIGS. 7 through 9 particularly indicate, each plate 48 has parallel recesses 48a, to accommodate a series of parallel resistance heater ribbons 51 and, as shown, these recesses 48a are separated by integral ribs 52. Spanning the ends of the recesses 48a and the strip heaters 51 which are carried thereby, are recesses 53 which carry ribbon heater strip elements 54. The heater strips 51 and 54 are commercially available from Watlow Electric Manufacturing of St. Louis, Missouri, and each include a pair of terminal posts 55 at one end, to which circuit wires may be connected. Each includes embedded resistance heating elements 56 (see FIG. 12), and each of the heating elements 51 and 54 are individually connected across a pair of power lines L1 and L2 in a circuit line such as shown at 57 in FIG. 12. Each circuit line 57 may be broken by a control switch 58 so that any one of the heater elements 54 and 51 may be shut down while the others are operating, and a zoned heat control effected. Thus, while only one circuit is illustrated for the sake of convenience, it is to be understood an identical circuit is provided for each element 51 and 54.

As FIGS. 8 and 9 particularly indicate, a cover plate 49 is fixed to the heater strip carrying plate 48 with its confronting surface in contact with the accessible surfaces of heater strips 51 and 54. Typically, the heater ribbons 51 and 54 will be formed of stainless steel within which is a mica sheath housing a mica core around which the electrical resistance heater wires are wrapped. Since there will be a far greater turn, or coil, density throughout the body of heater strips 51 and 54 than at the extreme ends thereof where the resistance wire coils connect to terminals 55, the body of heaters 51 and 54 will be at a considerably greater temperature than will the end parts mounting terminals 55. For this reason, the adjacent parallel heater strips 51 are oppositely disposed in a manner such that their terminals 55 are alternately at opposite ends, and this arrangement is utilized in order to minimize the size of the relatively cold spots which occur at terminals 55 and to achieve a uniformity of heat distribution. It is for the same reason that heater strips 54 are provided to span the ends of the heater strips 51, and that the pairs of terminals 55 for each of the strips 54, are disposed at opposite ends of the carrier plate 48.

Provided in the plate 49 are openings 59 to receive the terminal posts 55 and it will be seen that insulation covers 60 are provided for each of the terminal posts 55. To connect the plates 48 and 49 in tight sandwiched relation, while at the same time to provide for thermal expansion thereof in a direction b (FIG. 6) along the axis of their thickness, steel bolts 61 are threaded in the plates 48, extend through slightly enlarged openings 62 in the plates 49 and have back-to-back oppositely disposed disc spring washers, or belleville washers, 63 which are secured by a nut 64. Expansion of the plates 48 and 49 in the b direction, is permitted by the compressed washers 63 which can expand in the b direction. Similarly, steel bolts 65 threaded into the contactor or adapter plate 50 extend through openings 66 and 67, provided in the plates 49 and 48 respectively, and carry identical washers 68 which permit expansion of the plates 48 through 50 in the same b direction under the influence of higher temperature transfers. Finally, steel bolts 69 extend through partly over-sized openings 70 and 71 provided in the plates 48 and 49 respectively, and up through enlarged openings 72 provided in the insulator strips 74 (i.e. asbestos) which thermally insulate the platen 37, and the openings 44 – 46 in mount plates 42 and 43. Identical spring washers 74a permit expansion of plates 48 and 49 in the b direction, and a nut 75 is utilized to rigidly secure the parts to platen parts 42 and 43.

As FIG. 4 indicates the bolts or stud members 69, which are shown in chain lines in FIG. 4, are all carried by the aluminum plate assemblies, specifically plates 48, and are permitted to move with respect to openings 44, 45 and 46 which are of different shape according to their location to provide respectively for longitudinal or endwise expansion of the plates 48 through 50, transverse or widthwise expansion of the plates 48 through 50, and lateral expansion in directions therebetween.

As FIG. 12 indicates, advance solenoids 76 are provided for each of cylinders 139 and 140 to move the piston rods 38 is a direction toward the path of travel of carriages 16 and retract solenoids 77 are provided to restore them to the original spread-apart position, as shown in FIG. 2. The advance solenoids 76 are under the control of a switch 78 which may be automatically operated when a carriage assembly 16 is moved to an indexed position between the platens 37 and halted. The retract solenoids 77 are energized by a switch 79, operating under the influence of a conventional timer, started by a relay or contact switch when the platens 37 are moved to innermost position, and timing out after a "set" time when the sheets P have been heated to the desired forming temperature. A motor M is provided to drive the turntable shaft via a suitable geneva mechanism or other drive which will index the turntable T during intervals separated by a period of dwell.

THE OPERATION

An operator at the loading and unloading station U-L, and after unloading a previously formed sheet at station 11, will reload the clamp frame assembly 16 at station 12 by inserting a new sheet therein. To do this it is, of course, necessary to, at station 11, actuate the cylinders 27 to swing the parts 36a of clamp frame 36 downwardly and outwardly. At the loading assembly 12, with sheets being moved upwardly to a position against clamp frame surfaces 25a, cylinders 27 will then be operated in the reverse direction to swing the clamp plate parts 36a back to the position in which they are shown in FIG. 2. At this time, the loaded clamp frame is indexed to the position shown in FIG. 2 in which it is disposed between the retracted platens 37.

With operation of the switch 78, the cylinders 139 and 140 are operated to move the contactor plates 50 in a direction toward the sheet carrying carriage 16. It is to be understood that the plates 50 substantially come into contact with opposite sides of the sheet P, but never quite actually engage it. They are "set" to come into a position which may be ten thousandths of an inch removed from the surfaces of the sheets P, but this for practical purposes can be termed a "contacting", heat transfer relationship. The mechanism is set to operate in this manner to avoid compressing the sheet P. It is recognized that the under contactor plate 50 will, in fact, be engaged by, and support, the sheet P during the time the sheet is being heated to forming temperature.

While we have particularly described an apparatus for forming plastic sheets, it should be understood that the identical heating station may be employed for heating the metallic alloy superplastic sheets to which reference has been made. In this case, the sheets will be heated to a temperature, however, which approximates 500° F.

Unless some zoned heat control is desired, the heater strips 51 and 54 will be continuously energized, and the plates 48 through 50 will be maintained in a constant "hot" condition at a uniform temperature. At start-up, FIG. 4 indicates the position of the bolts 69, which rigidly secure the plates 48 through 50 to the platen 37. As the plates 48 through 50 are heated to operating temperature, the position of these bolts in openings 44, 45 and 46 changes in the matter indicated by the chain lines in FIG. 5a, as the plates 48 through 50 expand.

As FIG. 6 particularly indicates, the plate 49 is spaced a given air distance $x$ from the platen 37, and heat insulator pads 74 are provided under the mount members 42 and 43 to prevent heat transfer to the steel platen 37. The clamp frame parts 36 – 27, etc., are protected by the insulating asbestos strips 50a which completely surround the contactor plate 50. These strips serve to hold in heat which would otherwise be lost by side radiation.

Once the sheets P have been heated to the desired forming temperature, retract solenoids 77 are operated by the timer switch 79 to move the platens 37 apart to the withdrawn position shown in FIG. 2. After this, the carriage carrying the heated sheet P is indexed to the forming station 14, where a conventional forming operation is carried out, after which the formed sheet is indexed to the unload station 11.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. In differential pressure forming appartus including a contact heater mechanism for contact heating heat deformable sheet stock to a predetermined temperature a generally flat heater assembly having a central axis normal to the general plane of said heater assembly, the improvement comprising: a carrier assembly having a central axis coincident with said central axis of said heater assembly; a plurality of fastener members mounted on one assembly received in a plurality of fastener receiving openings in the other of said assemblies to mount the heater assembly upon the carrier assembly; means for moving the carrier assembly to and from a work heating station; a first pair of said openings being symmetrically spread on opposite sides of said central axis, said first pair of said openings being elongated in an $x$ direction parallel to a direct line connecting said openings and intersecting said central axis to accommodate thermal expansion of said heater assembly relative to said carrier assembly in said $x$ direction, a second pair of said openings being symmetrically spaced on opposite sides of said central axis and being elongated in a $y$ direction, normal to said $x$ direction, to accommodate thermal expansion of said heater assembly relative to said carrier assembly in said $y$ direction, said first and second pair of openings accommodating the aforementioned thermal expansion of said heater assembly relative to said carrier assembly while maintaining said central axes of said heater assembly and carrier assembly in coincidence with each other.

2. The invention defined in claim 1 wherein said heater assembly is of a generally flat rectangular configuration and said plurality of openings further comprises third and fourth pairs of openings symmetrically spaced on opposite sides of said central axis and with respect to said first and said second pairs of openings, said third and fourth pairs of openings being of enlarged circular configuration to accommodate thermal expansion of said heater assembly in any direction in said general plane.

3. The invention defined in claim 1 wherein said fastener means comprises bolt means accommodating thermal expansion of said heater assembly relative to said carrier in a $z$ direction mutually perpendicular to said $x$ and said $y$ directions.

4. In differential pressure forming apparatus including a contact heater mechanism for contact heating heat deformable sheet stock to a predetermined temperature, having a frame, reciprocatory ram means mounted upon said frame, a platen mounted on said ram means for movement therewith, a generally flat rectangular contact heating assembly, the improvement comprising: means mounting said heating assembly in spaced thermally insulated relationship to said platen comprising thermal insulating means disposed between said heater assembly and said platen, a plurality of elongate fastener elements projecting from one side of said heater assembly through respective aligned fastener receiving openings in said pad means and said platen to mount said heater assembly on said platen with said pad means clamped therebetween, said heater assembly being symmetrically disposed to the axis of said ram means and lying in a general plane normal to said axis, a plurality of pairs of said fastener receiving openings being symmetrically located on opposite sides of said axis and elongated in directions extending radially from said axis to accommodate thermal expansion of said heater assembly in said general plane while maintaining said heater assembly in its symmetrical disposition relative to said axis.

5. The invention defined in claim 4 wherein said heater assembly comprises a rectangular contact plate mounted on the side of said heater assembly remote from said platen, and thermal insulation means mounted upon the peripheral side edges of said contact plate.

6. The invention defined in claim 5 wherein said plurality of pairs of openings comprise a first pair of openings located on the transverse centerline of said rectangular heater assembly and a second pair of openings located on the longitudinal centerline of said rectangular heater assembly, said transverse and longitudinal centerlines intersecting each other at said axis, and four additional fastener receiving openings located at the respective corners of a rectangle having said first and second pairs of openings located at the midpoint of each of its sides, said four additional openings being constituted by circular bores of a diameter substantially exceeding that of said fastener means.

7. The invention defined in claim 6 further comprising means in said fastener means accommodating thermal expansion of said heater assembly in a direction parallel to said axis.

* * * * *